May 6, 1941.     H. SHAW     2,240,807
SPIRIT AND LIKE LEVELS
Filed Sept. 16, 1939     2 Sheets-Sheet 1
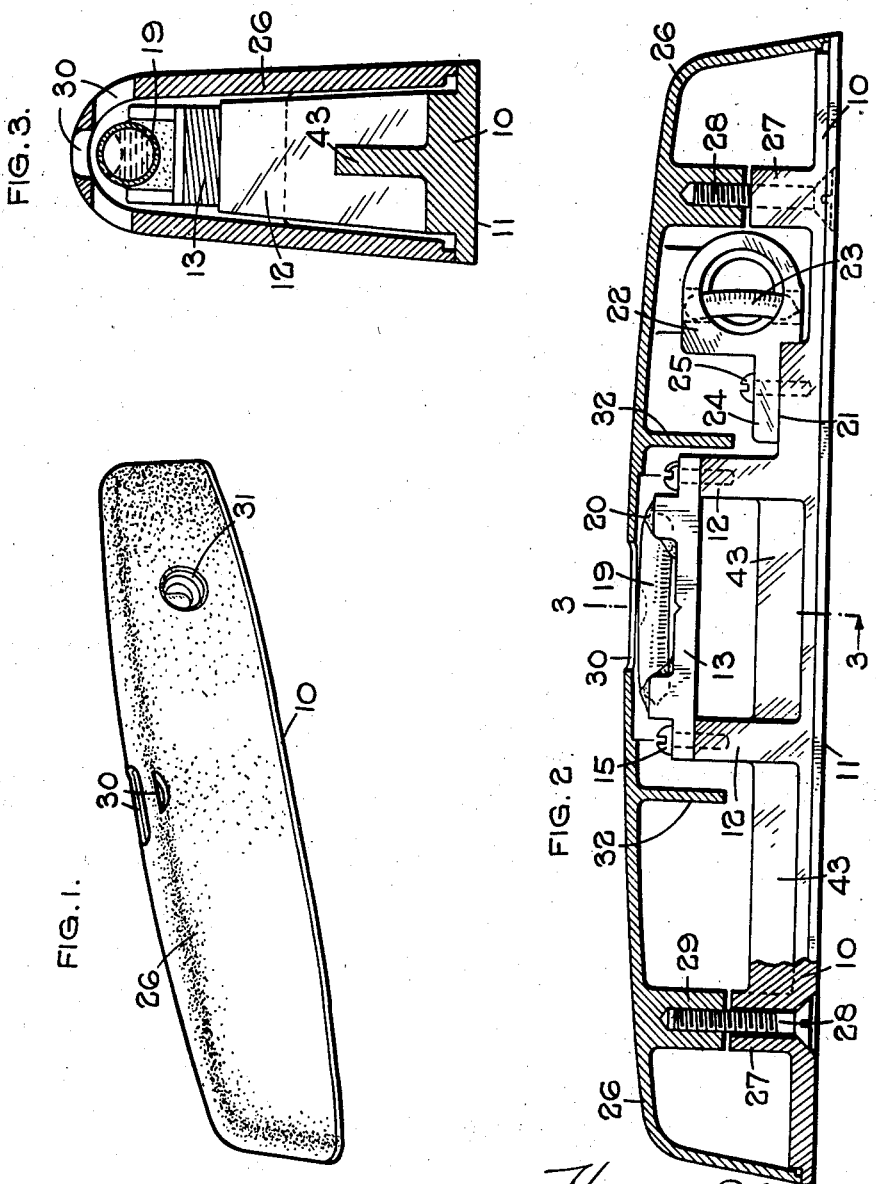

May 6, 1941.　　　　H. SHAW　　　　2,240,807
SPIRIT AND LIKE LEVELS
Filed Sept. 16, 1939　　　2 Sheets-Sheet 2
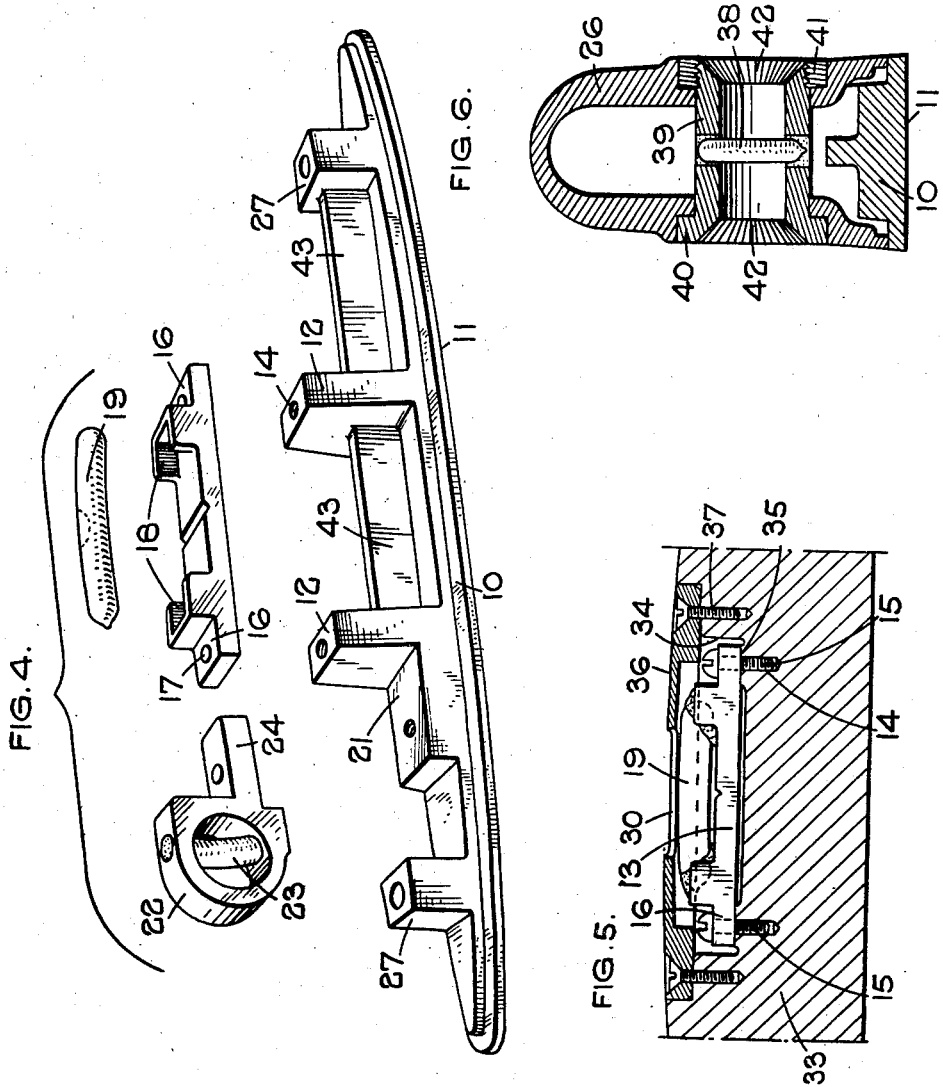

Patented May 6, 1941

2,240,807

UNITED STATES PATENT OFFICE 2,240,807

SPIRIT AND LIKE LEVELS

Henry Shaw, Birmingham, England, assignor to The Midland Saw & Tool Company Limited, Birmingham, England Application September 16, 1939, Serial No. 295,336
In Great Britain September 26, 1938

3 Claims. (Cl. 33—211)

This invention relates to spirit and like levels of the kind including a level tube containing liquid in which is an indicating bubble, such levelling tube being supported in a suitable casing or mounting structure.

With such levels, particularly of the kind adapted to be applied directly to the surface to be tested, the mounting structure is usually formed from wood and is recessed to receive the level tube which is located and secured in position by means of plaster of Paris or similar substance, which after initial setting of the level tube, hardens to fix the level tube in its set position.

With such a construction replacement of the level tube after fracture necessitates an entire re-setting of the instrument and it is difficult to ensure that the mounting structure for the tube shall remain true and free from warping, particularly when the instrument is exposed to adverse weather conditions as is frequently the case with levels used in the building and associated trades.

The primary object of the present invention is to provide a construction such that, in the event of the level tube being damaged or broken in use, a new unit can be obtained comprising a new tube accurately and rigidly set in its carrier by the manufacturer and this new unit can be fitted readily and accurately into the body of the spirit level, even by an unskilled or inexperienced person who can put the spirit level in condition for use without having access to means of testing the level, such for example as a known level testing surface.

Referring to the drawings:

Figure 1 is a perspective view of one construction according to this invention.

Figure 2 shows the same in part sectional elevation.

Figure 3 is a section on line 3—3 of Figure 2.

Figure 4 is an exploded view of part of same.

Figure 5 is a section of part of a modification.

Figure 6 is a sectional end elevation of a further modification.

In the construction illustrated in Figures 1 to 4 a spirit level of the kind adapted to be applied directly to the surface to be tested includes a base member 10 formed as a die casting and comprising a substantially flat plate, the under surface 11 of which is finished flat for direct application to the surface to be tested.

On the upper surface of the plate 10 are upwardly projecting lugs or bosses 12, the upper surface of each of these lugs or bosses being finished flat and parallel to the plane of the surface 11 to form seatings for the level tube carrier 13.

Each boss 12 is formed with an internally threaded hole 14 to receive screws 15 forming readily releasable clamping means for securing the tube carrier in position.

The tube carrier 13 as will be seen from Figure 4 is in the form of a small plate having attachment end portions 16 formed with holes 17 for the screws 15, the carrier having on its upper surface projections or seating portions 18 for the level tube 19.

Preferably the tube 19 is set in plaster or like material 20 in the tube carrier as is shown in Figure 5.

To one side of the lugs 12 the base plate is formed with a seating 21 for the carrier 22 of a plumb tube 23, this carrier having an attachment portion 24 fixed to the seating 21 by a screw 25.

The carrier 22 comprises a ring-like member formed with holes for the mounting of the plumb tube 23, the attachment portion 24 projecting from one side of this member.

An inverted trough-like cover 26 is provided for enclosing the tubes and the top of the base plate, this cover also preferably being formed as a diecasting and being of generally cigar shape in plan, namely, of maximum width at or adjacent the centre of its length and tapering to the rounded extremities.

The base plate is formed with a pair of hollow cylindrical bosses 27, one adjacent the end thereof and the cover is secured to the base plate by screws 28 inserted through holes in the bosses 27 and into internally screw threaded holes in further bosses 29 provided within the cover.

The base plate has integral ribs 43 extending between the bosses or lugs thereon, such ribs stiffening the base plate and minimising the possibility of distortion.

In the top of the cover there are formed sight openings 30 for exposing the level tube, whilst in the side walls of the cover at an appropriate position there are formed lateral openings 31 for exposing the plumb tube 23.

The cover may also be provided with internal ribs or partitions as indicated at 32 for stiffening and strengthening the cover, whilst the downwardly depending wall of the cover extends completely around the projecting portions of the base plate.

The lower edge of the peripheral wall of the cover may be tapered or undercut to seat upon a corresponding tapered edge or flange around the base plate when the two parts are secured together.

In assembly the tube carrier 13 is clamped firmly upon the flat surfaces of the projections 12 so as to be located in a definite relationship to the flat under surface 11 of the base plate and with this surface 11 seated upon a base plate or other pre-arranged horizontal surface, the level tube is set in the correct position within the plaster in the tube carrier 13 so that when this plaster sets the tube carrier will be fixed in the required position.

Similarly the plumb tube carrier is fixed in position upon the base plate and the plumb tube located in the carrier in the desired position as for example in a mounting of plaster or other suitable material so that the tube will be fixed automatically in relation to the base plate.

In the modification illustrated in Figure 5 the level includes a base member 33 of solid or hollow form recessed in its upper surface at 34 to receive the tube carrier 13 and formed in the base of this recess with seatings 35 to which the carrier is clamped by screws 15 as described above.

As in the previously described construction the tube carrier is fixed on the seatings and the tube 19 set in its desired position, after which the open top of the recess 34 is closed by a substantially flat cover plate 36 extending over the top of the level tube and provided with the necessary sight opening or openings 30.

This closure plate 36 is formed separately of the tube carrier 13 and secured by screws 37 but may if desired be formed by a top plate of the tube carrier.

For example, the tube carrier may be in the form of a flat top plate such as 36 with the sight opening 30 for exposing the level tube mounted within a cradle or bracket member formed on, or secured to, the underside of the top plate.

This top plate may be secured to the body 33 by screws 37 as in the above construction.

In a further modification illustrated in Figure 6 an adjustable plug is mounted in the cover 26, such adjustable plug comprising a tube 38 mounted in a cylindrical sleeve 39 carried in holes in the side walls of the cover 26.

This sleeve has an integral flange 40 at one end and is screw threaded at the other end to receive a ring-like nut 41 by means of which the sleeve can be clamped in position.

The sleeve 39 is adjustable in relation to the cover about an axis extending at right angles to the length of the tube and the two ends of the sleeve are serrated or knurled at 42 to facilitate adjustment of the plumb in relation to the cover.

Suitable markings or indications may be provided on the sleeve and on the cover to indicate the various positions of adjustment of the adjustable plumb.

This adjustable plumb may be applied to the constructions shown in Figures 1 to 4 at the end of the cover opposite to that at which the plumb tube 23 is mounted so that both vertical and adjustable plumbs are mounted on the same level.

The cover and the base member may be formed by casting from aluminium to reduce the weight of the level and when the two parts are secured together an extremely rigid but light level is provided and freedom from warping or distortion is ensured by the provision of the stiffening ribs or partitions.

When formed from aluminium or aluminium alloy the level may be finished in any one of a number of distinctive colours as, for example, by an anodising process.

In the event of fracture of one or other of the level tubes a replacement can readily be effected by obtaining a new tube already set in its carrier, the old carrier being detached and the new one clamped in position, whereon the level tube will be definitely located without further setting. All setting is performed when the tube is mounted within the carrier during assembly at the works and no subsequent setting is necessary. Thus, the replacement can be effected by an unskilled operator or by the owner of the level without difficulty.

If desired, however, the level tube may be mounted for adjustment in relation to the base member, the tube being again mounted, however, in a tube carrier supported adjustably upon the base member with suitable adjusting screws provided with the usual lock nuts.

What I claim then is:

1. A spirit or like level including a base member formed as a die casting, said base member comprising a substantially flat plate, the under surface of which is finished flat for direct application to the surface to be tested, bosses cast integral with and projecting upwardly from the upper surface of said plate, seatings on the tops of said bosses, a tube carrier, a level tube, seatings on said tube carrier, means for setting said level tube in said tube carrier in a definite level position relative to the seatings on the carrier, said latter seatings fitting directly and firmly on the seatings on said plate to mount the level tube in parallel relation to the under surface of the base member, releasable fastening means for securing said tube carrier rigidly to said base member to enable replacement of the level tube without re-setting of the level, a hollow elongated dome-like cover formed as a die casting extending completely over the upper surface of said plate, the edge of the open underside of the cover seating upon and conforming to the shape of the peripheral edge of the base plate, said cover having in its top an opening giving a sight of the level tube, but otherwise completely covering and enclosing the level tube and its carrier and releasable fastening means for securing said cover to said base member.

2. A spirit or like level including a base member formed as a die casting, said base member comprising a substantially flat plate, the under surface of which is finished flat for direct application to the surface to be tested, bosses cast integral with and projecting upwardly from the upper surface of said plate, seatings on the tops of said bosses, said seatings being parallel with the flat under surface of the base plate, a tube carrier, a level tube, seatings on said tube carrier, means for setting said level tube in said tube carrier in a definite level position relative to the seatings on the carrier, said latter seatings fitting directly and firmly on the seatings on said plate to mount the level tube in relation to the base member, releasable fastening means for securing said tube carrier rigidly to said base member to enable replacement of the level tube without re-setting of the level, an integral stiffening rib extending along the upper surface of, and longitudinally of, the base plate, integral hollow bosses on the upper surface of said base plate and opening into the underside thereof, a hollow elongated dome-like cover formed as a die casting extending completely over the upper surface of said plate, the edge of the open underside of the cover seating upon and conforming to the shape of the peripheral edge of the base plate, said cover having in its top an opening giving a sight of the level tube, but otherwise completely covering and enclosing the level tube and its carrier, releasable fastening bosses within and integral with said cover, said last-mentioned bosses having internally screw threaded holes and screws inserted through the hollow bosses of the base plate and screwed into the holes in the bosses of the cover for releasably securing said cover to said base member.

3. A spirit or like level including a base member formed as a die casting, said base member comprising a substantially flat plate, the under surface of which is finished flat for direct application to the surface to be tested, bosses cast integral with and projecting upwardly from the upper surface of said plate, seatings on the tops of said bosses, said seatings being parallel with the flat under surface of the base plate, a tube carrier, a level tube, seatings on said tube carrier, means for setting said level tube in said tube carrier in a definite level position relative to the seatings on the carrier, said latter seatings engaging the seatings on said base member to mount the level tube in relation to the base member, releasable fastening means for securing said tube carrier to said base member to enable accurate replacement of the level tube without resetting the level, a plumb tube carrier, a plumb tube, means for setting said plumb tube in said plumb tube carrier, a further boss on the upper surface of said plate, a further seating on said further boss parallel to the underside of the base plate, a seating on said plumb tube carrier for engagement with the further seating on said plate to mount the plumb tube in relation to the base member, an integral stiffening rib extending along the upper surface of, and longitudinally of, the base plate, integral hollow bosses on the upper surface of said base plate and opening into the underside thereof, a hollow elongated dome-like cover extending completely over the upper surface of said plate, said cover having openings exposing said level tube and said plumb tube but otherwise completely covering and enclosing said tubes and their carriers, bosses within and integral with said cover, said last-mentioned bosses having internally screwthreaded holes and screws inserted through the hollow bosses of the base plate and screwed into the holes in the bosses of the cover for releasably securing said cover to said base member.

HENRY SHAW.